United States Patent
Shah

(10) Patent No.: US 6,404,581 B1
(45) Date of Patent: Jun. 11, 2002

(54) ADAPTATION TO UNMEASURED VARIABLES

(75) Inventor: Sunil C. Shah, Los Altos, CA (US)

(73) Assignee: Voyan Technology, Santa Clara, CA (US)

(*) Notice: Subject to any disclaimer, the term of this patent is extended or adjusted under 35 U.S.C. 154(b) by 0 days.

(21) Appl. No.: 09/680,128

(22) Filed: Oct. 4, 2000

Related U.S. Application Data

(62) Division of application No. 09/345,166, filed on Jun. 30, 1999, now Pat. No. 6,230,062.
(60) Provisional application No. 60/115,165, filed on Jan. 8, 1999.

(51) Int. Cl.[7] .............................................. G11B 21/02
(52) U.S. Cl. ...................... 360/75; 360/78.09; 360/61; 700/29
(58) Field of Search ...................... 360/75, 61, 77.04, 360/78.04, 78.09, 77.02; 700/2, 8, 18, 20, 29

(56) References Cited

U.S. PATENT DOCUMENTS

| | | | |
|---|---|---|---|
| 3,958,109 A | 5/1976 | Doherty et al. ............. 235/151 |
| 4,200,827 A | 4/1980 | Oswald ....................... 318/561 |
| 4,321,517 A | 3/1982 | Touchton et al. ........... 318/618 |
| 4,398,228 A | 8/1983 | Bauck ......................... 360/77 |
| 4,663,704 A | 5/1987 | Jones et al. ................. 364/189 |
| 4,679,103 A | 7/1987 | Workman .................... 360/77 |
| 4,740,886 A | 4/1988 | Tanifuji et al. ............. 364/150 |
| 4,977,470 A | * 12/1990 | Murayama et al. ...... 360/77.04 |
| 5,034,914 A | 7/1991 | Osterlund ................... 364/900 |
| 5,088,058 A | 2/1992 | Salsburg ..................... 364/508 |
| 5,134,574 A | 7/1992 | Beaverstock et al. .. 364/551.01 |
| 5,150,289 A | 9/1992 | Badavas ..................... 364/154 |
| 5,155,845 A | 10/1992 | Beal et al. .................. 395/575 |
| 5,202,837 A | 4/1993 | Coe et al. ................... 364/476 |
| 5,268,625 A | 12/1993 | Plummer ..................... 318/610 |
| 5,280,425 A | 1/1994 | Hogge ......................... 364/402 |
| 5,301,100 A | 4/1994 | Wagner ....................... 364/148 |
| 5,307,346 A | 4/1994 | Fieldhouse ................. 370/85.1 |
| 5,311,562 A | 5/1994 | Palusamy et al. ........... 376/215 |
| 5,406,473 A | 4/1995 | Yoshikura et al. .......... 364/140 |
| 5,406,496 A | 4/1995 | Quinn ......................... 364/484 |
| 5,432,711 A | 7/1995 | Jackson et al. ............. 364/514 |
| 5,452,201 A | 9/1995 | Pieronek et al. ............ 364/188 |
| 5,483,448 A | 1/1996 | Liubakka et al. ...... 364/424.05 |
| 5,486,996 A | 1/1996 | Samad et al. ................ 364/152 |
| 5,493,516 A | 2/1996 | Bromhead et al. .......... 364/553 |
| 5,495,419 A | 2/1996 | Rostoker et al. ............ 364/468 |

(List continued on next page.)

OTHER PUBLICATIONS

Sunil C. Shah, Michel A. Floyd, Larry L. Lehmann, *Computer–Aided Control Systems Engineering*, 1985, pp. 181–207.

(List continued on next page.)

*Primary Examiner*—Andrew L. Sniezek
(74) *Attorney, Agent, or Firm*—Blakely, Sokoloff, Taylor & Zafman

(57) ABSTRACT

A scheme for management of uncertainty in control systems that require adaptation is described. The scheme removes as much uncertainty as possible at design time and manufacturing time by taking advantage of available compute resources in pre-computing a large set of robustness-performance tradeoff based model controllers at different operating conditions for different values of uncertainty parameters that occur in-use and in manufacturing. A group of control models, and corresponding model controllers with an uncertainty bound larger than the best-tuned controller, are generated. A subset of the model controllers is implemented in the system at manufacturing time based on characterization of the system. The subset of model controllers is switched at run time based on transient information received during operation of the system.

21 Claims, 10 Drawing Sheets

U.S. PATENT DOCUMENTS

| | | |
|---|---|---|
| 5,548,601 A | 8/1996 | Kato et al. .................. 371/68.1 |
| 5,572,430 A | 11/1996 | Akasaka et al. ........ 364/468.01 |
| 5,576,946 A | 11/1996 | Bender et al. .............. 364/146 |
| 5,609,136 A | 3/1997 | Tuken ........................ 123/357 |
| 5,610,808 A | 3/1997 | Squires et al. .............. 364/131 |
| 5,671,098 A | 9/1997 | Mathews et al. ............. 360/67 |
| 5,729,466 A | 3/1998 | Bamji ........................ 364/488 |
| 5,784,596 A | 7/1998 | Melamed et al. ........... 395/500 |
| 5,796,607 A | 8/1998 | Le Van Suu ........... 364/140.01 |
| 5,880,959 A | 3/1999 | Shah et al. ............ 364/468.03 |
| 5,903,474 A | 5/1999 | Sadler et al. .......... 364/551.02 |
| 5,953,238 A | 9/1999 | Mowry et al. .............. 364/578 |
| 5,963,445 A | 10/1999 | Lassle ................... 364/140.02 |
| 5,963,448 A | 10/1999 | Flood et al. ................ 364/187 |
| 5,971,583 A | 10/1999 | Ohnishi et al. ........ 364/468.04 |
| 6,000,833 A | 12/1999 | Gershenfeld et al. ....... 364/578 |

OTHER PUBLICATIONS

Judea Pearl, *Heuristics: Intelligent Search Strategies for Computer Problem Solving*, 1984, pp. 33–70.

Judea Pearl, *Probabilistic Reasoning in Intelligent Systems: Networks of Plausible Inference* (revised second printing), 1988, pp. 289–331.

Yu–Cai Zhu, "Black–Box Identification of MIMO Transfer Functions: Asymptotic Properties of Prediction Error Models," International Journal of Adaptive Control and Signal Processing, vol. 3, (1989), pp. 357–373.

Brian D.O. Anderson, John B. Moore, *Optimal Filtering*, Prentice Hall Publ. (1979), Ch. 10.

Gene F. Franklin, J. David Powell, Michael L. Workman, Digital Control of Dynamic Systems, 2nd Edition, Addison-Wesley Publishing, pp. 581–747.

$\mu$–Analysis and Synthesis Toolbox User's Guide, Matlab, The Math Works, Inc., Natick Massachusetts, 1998.

Ljung, Lennart, System Identification, Theory for the User, 2nd Edition, Prentice–Hall, 1999.

Willsky, A., "A Generalized Likelihood Ratio Approach To State Estimation In Linear Systems Subect To Abrupt Changes," Proceedings of the IEEE CDC, 1974, pp. 846–853.

\* cited by examiner

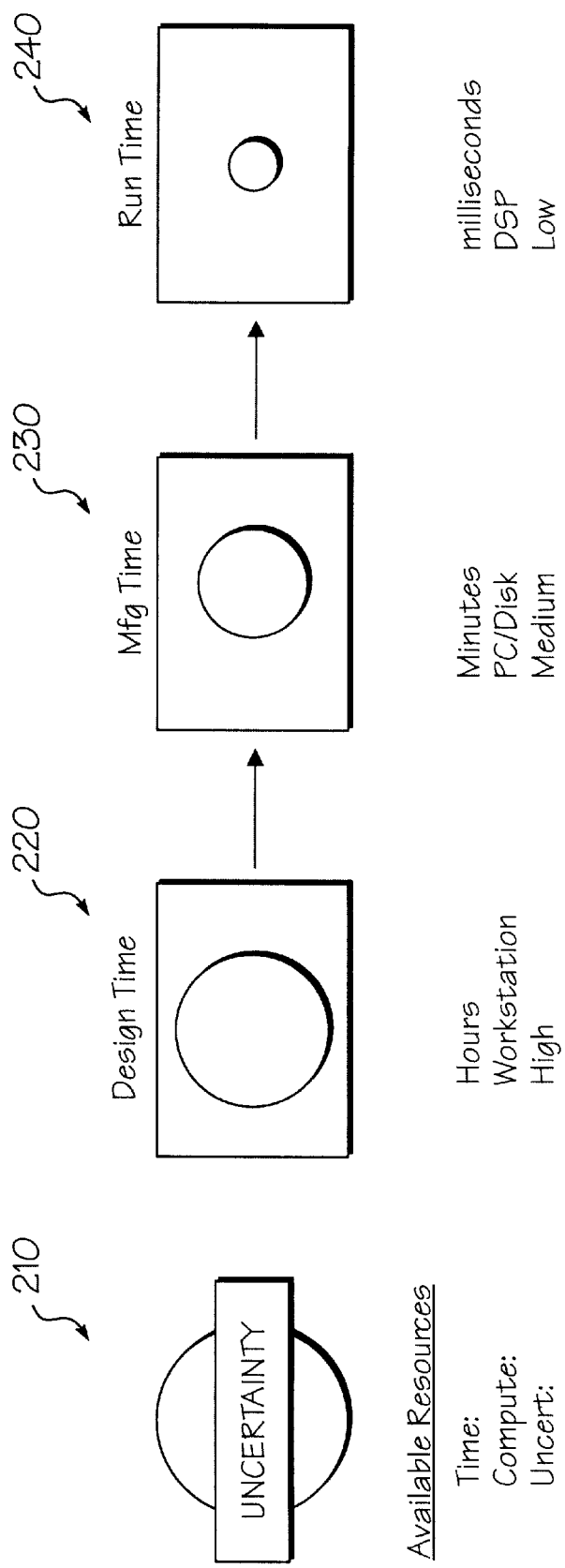

ADAPTATION TO UNMEASURED VARIABLES

REFERENCE TO RELATED APPLICATION

This is a divisional of application Ser. No. 09/345,166, filed on Jun. 30, 1999 now U.S. Pat. No. 6,230,062.

This application claims the benefit of U.S. Provisional Application No. 60/115,165 Jan. 8, 1999.

FIELD OF THE INVENTION

This invention relates to the field of control systems and, more specifically, to management of uncertainty in control systems that require adaptation.

BACKGROUND

The design of new systems is becoming increasingly complex because of reliance on high performance features requiring tight tolerances and more robustness to system variations, for example, in resonance and anti-resonance. Resonance is a phenomenon that occurs in different types of systems, including mechanical, electrical, and acoustic systems. Many industries, for example, the disk drive industry, rely on system component redesigns in order to handle the resonances in their systems because current disk drive servo systems are unstable in the presence of resonances.

In a disk drive, a servo system is typically used to position a head assembly relative to a disk in order to reproducibly read and write data onto a specific location of a disk. The industry trend is toward increasing data storage densities and decreasing data access times by packing data locations as close to one another as possible (i.e., increasing track density) and by faster positioning of head assemblies over the data locations (i.e., decreasing seek time). This, however, leads to problems with resonance that develops in servo systems having tight alignment tolerances. Mechanical resonances in servo systems are a result of complex vibration interactions in the disk drives. Whereas, electrical resonances and anti-resonances in channel transfer functions may be the result of transmission line taps.

For example, in a magnetic disk drive, a head is flown over the disk surface on a thin air bearing. Mechanical vibrations in the drive due to air turbulence may result in tracking (i.e., head positioning) errors, thereby limiting achievable storage densities or resulting in increased access times to allow for resonance to dampen out of the system.

Unmeasured variables may affect the operation of a drive and can cause variations in performance from unit-to-unit, as well as within a unit, during use of the drive. These variables may include, for examples: temperature, spindle bearing asperity, disk flutter induced non-repeatable run-out (NRRO), and variable repeatable run-out (RRO).

One solution for reducing track errors is to redesign disk drive components that contribute to system resonance. Resonance may be engineered out by, for examples: designing smaller head assemblies, redesigning drive enclosures and mounts, and using disk materials that reduce disk flutter. Mechanically engineering out resonances, however, may be expensive and may delay getting a product to market.

Another solution is to design a servo control system so that the bandwidth of the system is increased and the resonant frequency is close to or inside the bandwidth of the system. The system bandwidth can be generally described as the range of frequencies within which a system will respond satisfactorily with acceptable gain and phase response. The gain margin and the phase response are measures of the relative stability of a system. The phase response of a system changes rapidly near resonance. As such, increasing the system's bandwidth and moving the resonant frequency nearer to a system's cross-over frequency makes the servo system more sensitive to the gain and phase response of the resonance.

One problem with these prior art servo systems is that as the system's bandwidth is increased, the performance of the system degrades due to unit-to-unit manufacturing variations as well as variations within a particular unit operated under different conditions. The performance of a system may be defined, for example, in terms of root mean square (rms) in servo tracking errors as a response to given vibrations, measurement noise, and run-outs. As such, a resulting high bandwidth control system will have less robustness (i.e., less gain and phase margin).

Another problem with prior solutions is that a large uncertainty results when attempting to design only a fixed disk drive control system using only one model that accounts for all system variations. A single controller that has to handle all the variations without adapting requires high robustness to large uncertainty in the control design models. Large model uncertainty leads to poorer achievable performance because the design has to achieve that performance over a much larger set of models. Therefore, a single controller has to sacrifice performance to achieve robustness.

As an example, it is difficult to predict structural frequencies of disk drive components using simulation models as unit-to-unit variations dominate variations in responses. In addition, the parameter estimation schemes used in prior art solutions have difficulty in accurately determining resonant modes in the presence of unmeasured stochastic and periodic disturbances with limited closed loop data. As such, the phase variations in the resulting transfer function of the drive control system are large, requiring high phase and gain margins nearing resonance. Furthermore, in-use variations such as those due to temperature and external vibrations create even more uncertainty. A larger uncertainty in the models used in control system design results in a lower performance in actual operation of the disk drive.

As such, prior art solutions that do not adapt to the changes caused by unmeasured variables are limited by the accuracy of one control model of a system, and do not allow for increased control performance based on resource utilization at design and manufacturing time. Although, conventional parameter adaptive schemes, for examples: Model Reference Adaptive Control (MRAC), Self-Tuning Regulator (STR), and Pole-Placement, may be effective in low bandwidth, low noise systems, these methods have significant in-use robustness problems in higher bandwidth systems (e.g., disk drive servo control systems). Adaptation to changes caused by unmeasured variables in resonant systems with such prior art methods is non-robust because prior art adaptive methods: 1) do not account for uncertainty in models; 2) attempt to handle adaptation to large in-use and unit-to-unit variations ignoring model uncertainty; and 3) do not attempt to match compute resource utilization with information that is available at design and manufacturing time.

SUMMARY OF THE INVENTION

The present invention pertains to a method of generating a control system. The method may include generating a set of control models of the plant based on an operation of a prototype at a design time. The method may also include characterizing the operation of the plant at a manufacturing time and selecting a set of model controllers based on the characterizing of the operation of the plant at manufacturing time. Each of the model controllers may corresponded to one of the control models. In one embodiment, the method may also include selecting one of the model controllers at a run time based on an operating parameter.

In one embodiment, the present invention includes a plant controller having model controllers. Each of the model controllers may be coupled to receive monitored signals and generate a control signal. The plant controller may also include a data evaluator coupled to receive the monitored signals and generate an output. The data evaluator determines when sufficient information from the monitored signals is received. The data evaluator may be coupled to select the control signal of one of the model controllers based on the output of the data evaluator.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 2 illustrates an embodiment of the development of a control system.

DETAILED DESCRIPTION

In the following description, numerous specific details are set forth such as examples of specific systems, components, parameters, etc. in order to provide a thorough understanding of the present invention. It will be obvious, however, to one skilled in the art that these specific details need not be employed to practice the present invention. In other instances, well-known materials or methods have not been described in detail in order to avoid unnecessarily obscuring the present invention.

A method for adaptation to unmeasured variables in the design, manufacture, and control of a plant is described. A plant is a controlled element in a system that may be, for examples, a process, an article, and/or a machine. A controller is employed to control particular values or conditions of the plant in response to factors that influence the behavior of the plant. In one embodiment, the control scheme includes: generating a group of control models of a plant at a design time based on characterizing and evaluating prototypes of the plant under various conditions; characterizing and evaluating the performance of the plant at a manufacturing time, and; selecting a sub-set of the group of control models based on the characterization of the plant at manufacturing time to control an individual plant during run time. In one embodiment, a metric of uncertainty is maintained that is used in selecting appropriate control models with specific robustness-performance tradeoffs.

The control scheme described herein may be implemented with a wide variety of systems including acoustical, mechanical, and electrical systems. For example, the control scheme described herein may be used to provide control of resonance in a disk drive system as discussed below. It should be noted, however, that the control scheme is described in relation to a disk drive system only for illustrative purposes and is not meant to be limited to control of resonance in disk drive systems.

Figure 1:
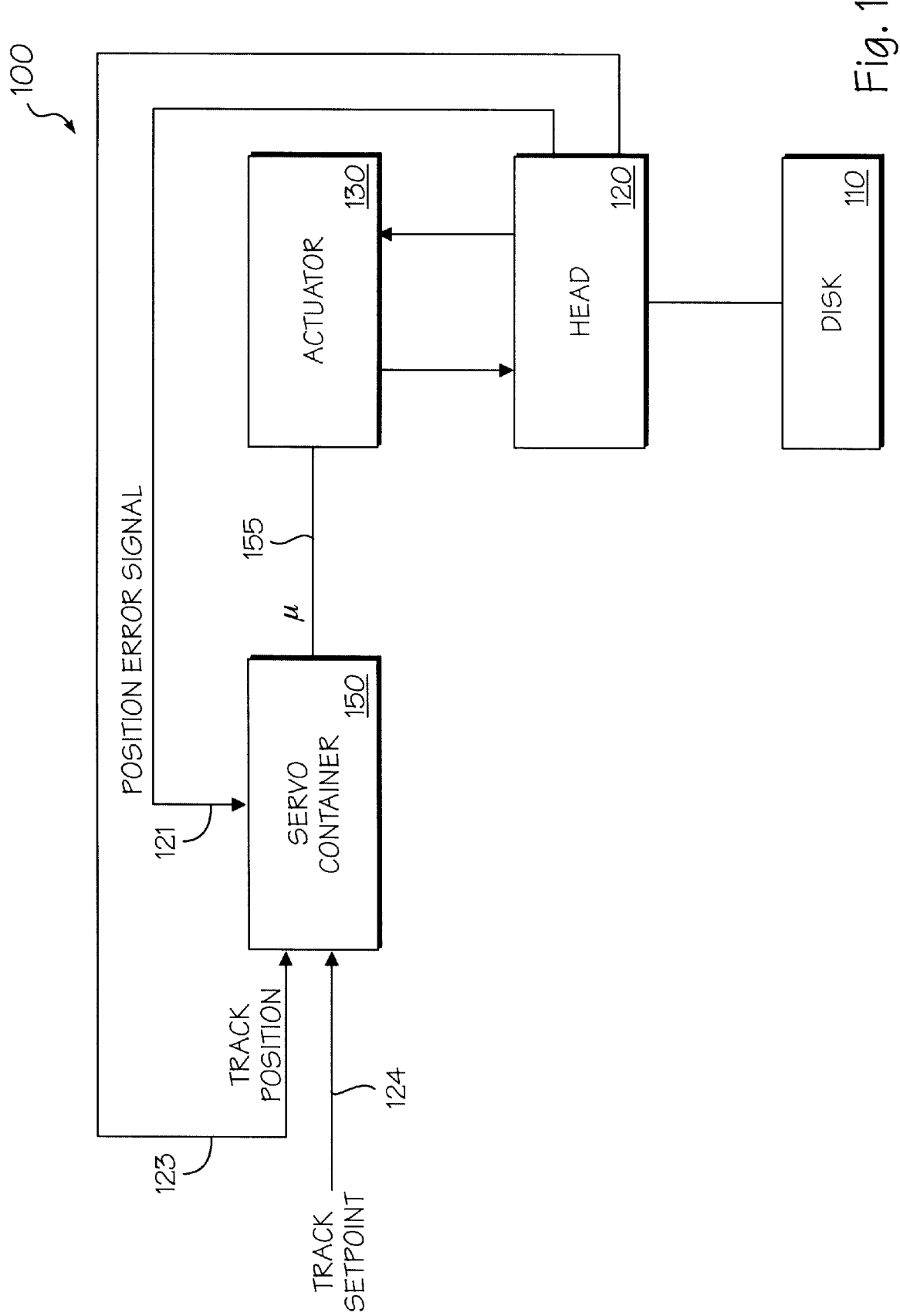
FIG. 1 illustrates an embodiment of a controller used with a disk drive system.

FIG. 1 illustrates one embodiment of a controller used with a disk drive system. The disk drive 100 includes a disk 110 having concentric tracks containing stored data, a head 120 for reading and writing the data on disk 110, an actuator 130 to position the head over a desired track during read and write operations, and a servo controller 150 to control actuator 130. The movement of head 120 to a desired track is referred to as "seeking" and the maintenance of head 120 over the desired track is referred to as "settling." In one embodiment, actuator 130 is a voice coil motor (VCM). In other embodiments, actuator 130 may be other types of motors, for example, a stepper motor.

A VCM contains a coil that is movable in a magnetic field of a magnetic stator. Applying current to the VCM causes the coil to move which, in turn, causes head 120 to move in a radial direction across disk 110. The acceleration of the coil is proportional to the applied current. The track information is incorporated into disk 110 and read by a servo control system using head 120. The servo controller 150 uses the track information to maintain head 120 precisely aligned over a track on disk 110 based on track setpoint signal 124. The track information is demodulated to generate a position error signal 121 indicating the position of head 120 away from the nearest track centerline. A position sensor signal (Ypos) is generated by adding the track position signal 123 to position error signal 121. The position sensor signal is used in the servo control system feedback loop to generate a control signal 155 to the VCM to move head 120 back to the track centerline.

During operation of the VCM, resonant modes in the system cause variations in the coil current in the VCM, resulting in movement of head 120 away from the track centerline. Having resonant frequencies at or near the bandwidth of the system can lead to instabilities in the system. During seeking, resonances may not have a significant affect on head 120 positioning as the primary contribution to the total forces on head 120 comes from the current that is applied to the actuator. However, during settling, resonance may become a primary contributor to head position error and must be quickly compensated for by the servo control system. The servo control system produces a current in the VCM in order to maintain head 120 over the centerline of the track. In one embodiment, the servo controller 150 includes a multiple model controller that enables the servo controller to adapt to a large range of resonance. Such a multiple model controller has the ability to handle a larger range of resonances than may be handled by prior art parameter adaptive controllers.

FIG. 2 illustrates an embodiment of the development of a control system. In one embodiment, the uncertainty in models characterizing a plant is successively reduced from design time 220 to manufacturing time 230, and then further reduced at run time 240, for the specific plant under specific operating conditions. At design time 240, a limited number of representative prototype units are available and are characterized at specific wide ranging operating conditions. In one embodiment, specific operating conditions may be, for example, specific values of temperature, humidity, age, and/or vibration spectrum, for a specific head, on a specific region of the platter. The available prototype drives are characterized at each of the specific conditions, using system identification techniques in a design cycle as discussed below in relation to FIG. 3. Using uncertainty calculations for models and trajectory refinement in the design cycle of FIG. 3, the uncertainty 210 in the models at the specific conditions may be reduced to the limit of available resources at design time.

Once the uncertainty 210 is reduced during design time 220 and manufacturing time 230, the information gathered from these processes is used to identify patterns of uncertainty in each individual plant. These patterns are then used to sub-select model controllers at manufacturing time 230 and to further reduce uncertainty during run time 240 of each plant individually.

At design time 220, the highest amount of uncertainty exists about a system. However, the greatest amount of resources for reducing the uncertainty is also available at design time 220. For example, at design time 220, hours of computing time and large workstations are available to generate control models. The amount of uncertainty at manufacturing time 230 decreases, but so does the resources for reducing the uncertainty. For example, resources available at manufacturing time 230 are minutes of compute time and smaller microprocessors that characterize the drive and find the closest matching control models from those generated at design time 220.

At run time 240 the uncertainties are reduced to a lower level (compared to the uncertainty at design time). But the resources available to reduce or handle the uncertainty at run time 240 are also lessened. For example, the resources that are available at run time 240 are on the order of milliseconds of compute time and digital signal processors within an individual plant (or unit) that are used to implement a model controller. As such, more calculations are performed at times when more compute power is available. A metric of uncertainty (given the level of available information) is maintained and used in selecting an appropriate control model with a specific robustness-performance tradeoff.

Figure 3A:
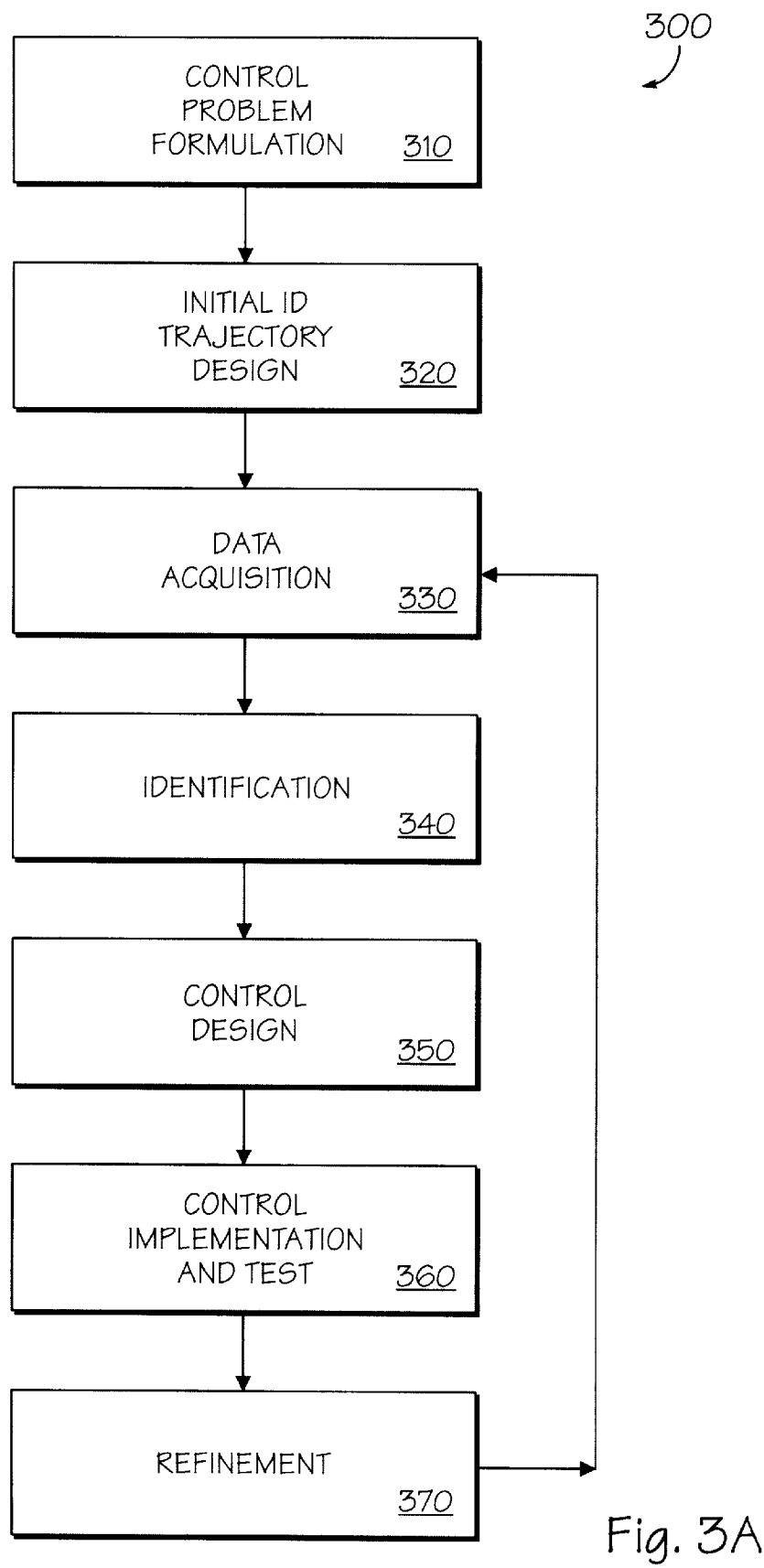
FIG. 3A illustrates an embodiment of a design cycle.

FIG. 3A illustrates an embodiment of a design cycle. In one embodiment, the design cycle 300 may be used to develop a servo controller for a disk drive system. In step 310, the control problem is formulated for the system. In formulating the control problem, various operating conditions for performing evaluation and testing may be established. In one embodiment, the conditions (e.g., vibration and thermal) that are established are those conditions that the system is expected to perform under, referred to as corner conditions.

At step 320, initial trajectory design is performed to identify the excitation trajectories to be used during data acquisition. In one embodiment, one or more prototype units of the system are used to perform the initial trajectory design. In another embodiment, an initial simulation model may be used to perform the initial trajectory design.

In one embodiment, the trajectories are time varying sinusoidal wave-forms starting near the rotation frequency of the drive. In another embodiment, the system is excited in a frequency range of approximately 10 Hz to the Nyquist rate of approximately 10 kHz. The resulting position signal (Ypos) excursions should be large enough so that the system is designed to spend only a small portion of time in regions of phase space where small stresses (during the manufacture of the disk drive) dominate the torque forces applied by the VCM on the disk drive head. These torque forces may be, for examples: micro-welding and/or pre-rolling friction stresses. The input signal and Ypos variations created by test conditions after manufacturing are also considered. These test conditions may correspond to a variety of mechanical and environmental tests that a manufactured drive may be subjected to in actual use.

Figure 3B:
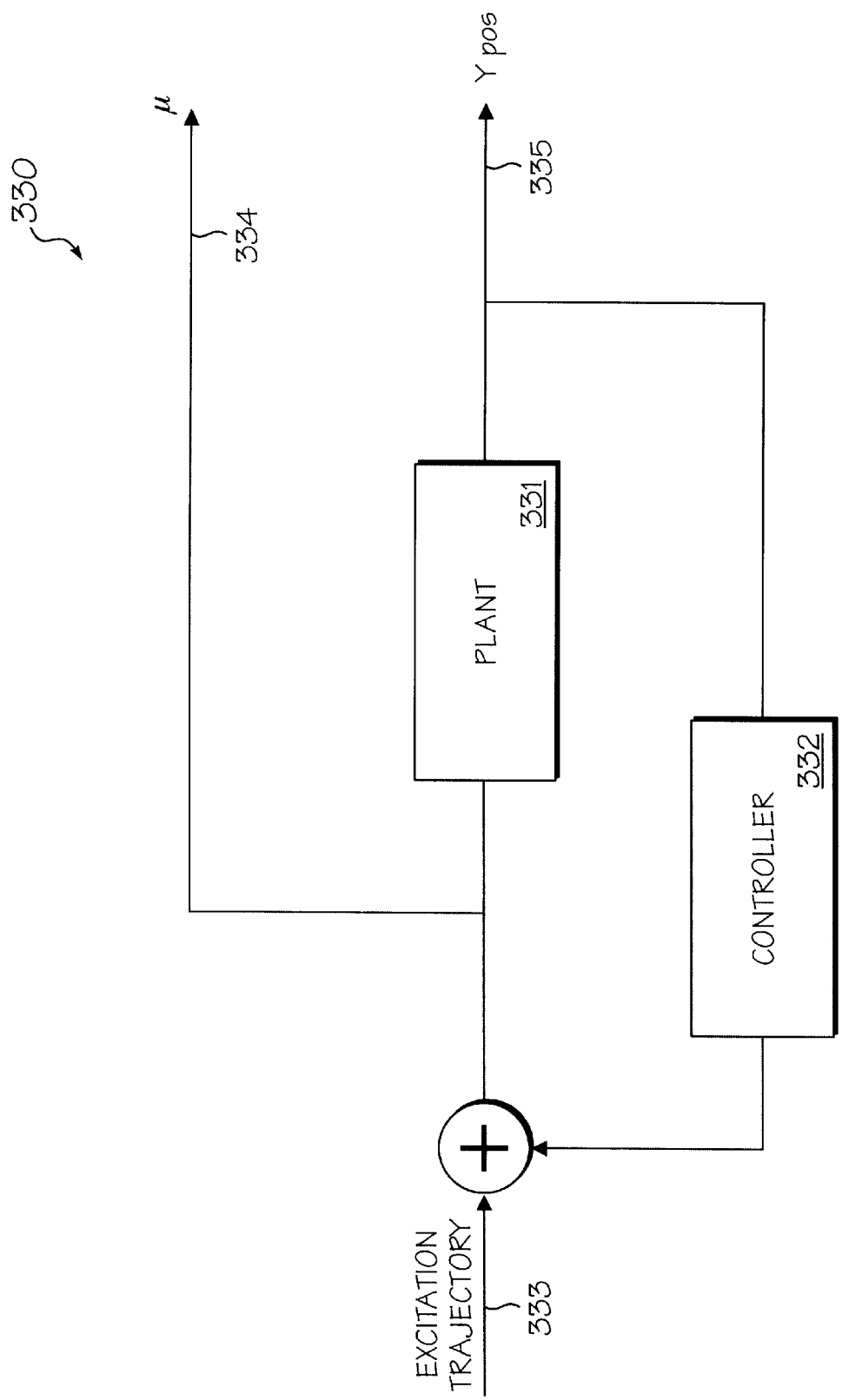
FIG. 3B illustrates an embodiment of a closed loop system on which data acquisition is performed.

At step 330, closed loop data is acquired on the system using a prototype unit, as illustrated in FIG. 3B. A specific operating condition is selected under which closed loop data acquisition is to be performed on the prototype unit. The trajectory 333 from step 320 of FIG. 3A, and the feedback from controller 332 is input to plant 331, while the corresponding control signal 334 and Ypos signal 336 data is collected. In one embodiment, controller 332 may be a baseline controller. In another embodiment, controller 332 may be a controller selected from a previous design iteration.

The data from step 330 is then used to perform system identification, at step 340. The identification generates a control model of the prototype unit based on characterization data of the behavior (i.e., input and output signals) of the prototype unit. The control model represents the plant model of the unit, including disturbances (as discussed in detail below with respect to FIG. 4), and model uncertainty (additive, multiplicative and/or structural singular value bound used for control design). In one embodiment, a software design tool may be used for system identification, for examples: Matlab® Control Module and System Identification Module, Matlab® $\mu$-Analysis and Synthesis Toolbox, Matlab® System Identification Module (all available from Mathworks, Inc. of Natick, Mass.), and MATRIXX® Robust Control Module and System Identification Module (available from Integrated Systems, Inc. of Sunnyvale, Calif.).

At step 350, a set of algorithms is used to generate model controllers from the control models of step 340. In one embodiment, the algorithms may be generated using H-infinity control design methods. In other embodiments, other control design methods may be used, for example, $\mu$-synthesis control design, as described in $\mu$-Analysis and Synthesis Toolbox User's Guide, Matlab, Mathworks Inc., Natick Mass., 1998. These control design methods are well known in the art; accordingly, a more detailed description of these methods is not provided herein.

At step 360, a particular model controller, developed from control design step 350, is implemented in one or more prototype units and exposed to a test condition. In one embodiment, the model controller includes a combination of an estimator and controller designed using a given control model (indexed by i as discussed in detail below with respect to FIG. 6). A test condition may include one of a variety of operating conditions that a manufactured drive may experience. The operation of the unit is characterized and its performance is diagnosed.

Figure 3C:
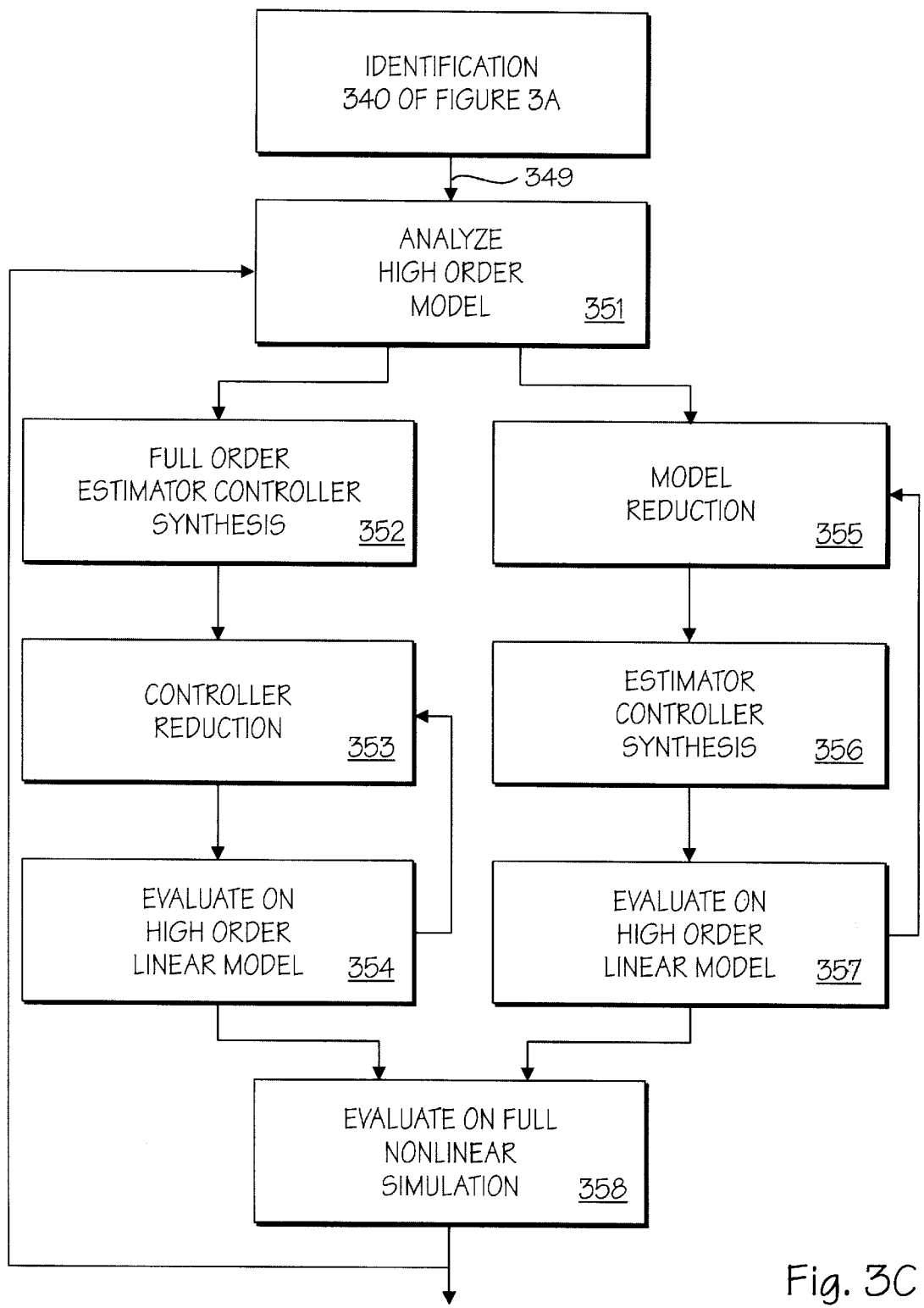
FIG. 3C illustrates an embodiment of control design and control implementation.

FIG. 3C illustrates one embodiment of control design. In one embodiment, a set of linearized differential equations is computed based on data from identification 340 of FIG. 3A. At step 351, a high order model is developed as described below in relation to FIG. 4.

In one embodiment, at step 355, model reduction is performed by computing an approximate model of the linear high order model, of step 351, with a fewer number of states than the high order model. This may also provide an estimate of errors due to the approximation. At step 356, estimator controller or controller synthesis may be performed including computing an estimator and/or controller that optimizes certain properties, for examples, $H_2$, $H_\infty$, or the $\mu$ norm of the closed loop system. At step 357, the high order model is evaluated by computing multivariable frequency responses, step responses, responses to stochastic noise processes, eigenvalues, and/or measures of robustness for the closed loop system consisting of the high order model and the synthesized estimator controller or controller.

In another embodiment, at step 352, full order estimator controller or controller synthesis may be performed by computing an estimator controller that optimizes the properties of the closed loop system. At step 353, controller reduction is performed by computing an approximate estimator controller of the full order estimator controller of step 352, with fewer states than the full order estimator controller. At step 626, the high order model is evaluated by computing multivariable frequency responses, step responses, responses to stochastic noise processes, eigenvalues, and/or measures of robustness for the closed loop system consisting of the high order model and the estimator controller or controller from step 353.

In one embodiment, at step 358, a full nonlinear simulation may be performed by using the estimator controller or controller from step 353, or step 356, and running non-linear closed loop simulations for various initial data values and perturbed model parameters. The resulting estimator controller or controller satisfying robustness and performance criteria is the model controller for the control model. These model controllers may also be referred to as robust-performance design based model controllers.

Referring back to FIG. 3A, in one embodiment, the steps of design cycle 300 may be executed multiple times to perform higher level iterations involving refined identification excitation trajectory, identification, and control design implementation, step 370. In one embodiment, computation of bounds on model errors for identification and refinement of identification excitation trajectory may be performed as is disclosed in co-pending U.S. patent application entitled "MODEL ERROR BOUNDS FOR IDENTIFICATION OF STOCHASTIC MODELS FOR CONTROL DESIGN," application Ser. No. 09/345,640 filed on Jun. 30, 1999 assigned to the assignee of the application herein, and incorporated herein by reference.

In one embodiment, the same prototype unit is used to repeat steps 330 to 360 under a different operating condition. In another embodiment, additional prototype units may be used to repeat steps 330 to 360 in order to obtain a representative sample of in-use variations as well as a smaller sample of manufacturing variations. In an alternative embodiment, steps 350 and 360 may not be performed if step 340 provides a sufficiently accurate identification of the system and a mathematically compatible bound on model uncertainty, for example, as disclosed in: co-pending U.S. patent application entitled, "REAL-TIME PLANNER FOR DESIGN," application Ser. No. 09/345,172 filed on Jun. 30, 1999 assigned to the assignee of the application herein, and incorporated herein by reference; and co-pending U.S. patent application entitled "MODEL ERROR BOUNDS FOR IDENTIFICATION OF STOCHASTIC MODELS FOR CONTROL DESIGN," application Ser. No. 09/345,640 filed on Jun. 30, 1999.

In an alternative embodiment, design cycle 300 may choose different methods for design of a control model depending on specific design objectives as described, for example, in U.S. Pat. No. 5,880,959 of Shah, et al., and "REAL-TIME PLANNER FOR DESIGN," application Ser. No. 09/345,172 filed on Jun. 30, 1999 both assigned to the assignee of the application herein and both incorporated herein by reference.

Figure 4:
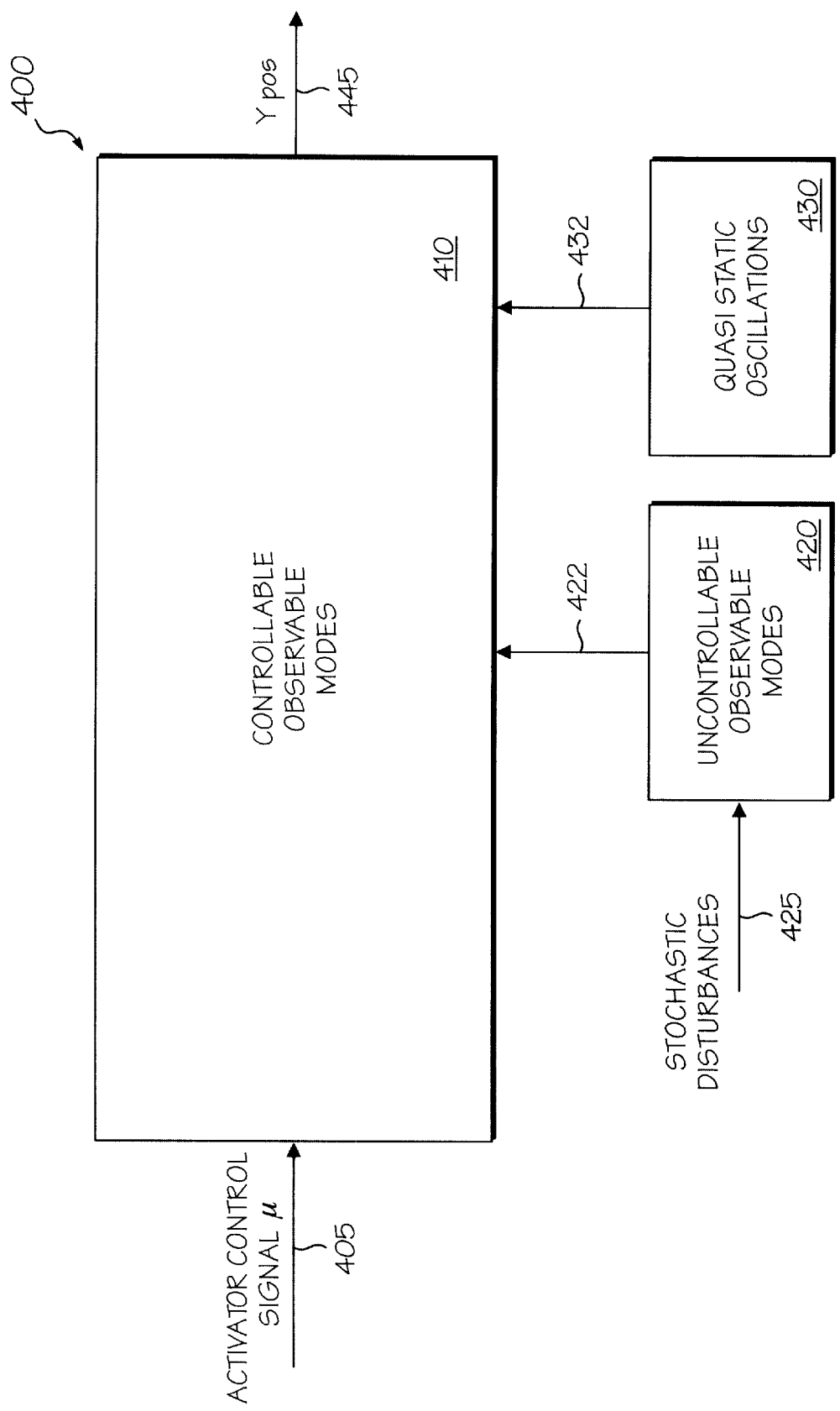
FIG. 4 illustrates an embodiment of a control model structure for system identification performed at design time.

FIG. 4 illustrates an embodiment of a control model structure for system identification performed at design time. Available computing resources at design time 220 of FIG. 2 are taken advantage of by pre-computing a large set of control models for different plant conditions that can occur in-use and in the manufacturing of the system. Identification with specific model structure, as shown in FIG. 4, is used to obtain well-tuned control models from limited closed loop data. Identification for plant model 400 allows for the affects of the three components: controllable observable modes 410, uncontrollable observable modes 420, and quasi-static oscillations 430. Concurrent estimation of all components in the control model allows accurate estimation of each component.

In one embodiment, identification for a servo control system may be performed by running closed loop tests on a prototype unit, as discussed above in relation to FIG. 3B. The plant model 400 includes controllable and observable modes 410 as well as uncontrollable and observable modes 420. Plant model 400 may be excited with uncontrollable observable modes 420 due to stochastic disturbances 425, for example, run-out. Run-out is a condition where a head deviates from a track being followed and may be caused by factors such as mechanical vibrations and electrical noise in the measurement circuitry of the head. These disturbances permeate through the resonant structures that are inherent in a disk drive. In addition, plant model 400 is excited with quasi-static oscillations 430, for example, quasi-periodic run-out. Quasi-periodic run-out is a slowly changing periodic signal that may be caused by, for examples: deformation of a disk platter and/or an off-axis disk.

In one embodiment, high order methods of estimation may be used, for example, auto regressive with exogenous inputs (ARX) estimation and prediction error methods (PEM) (See Ljung, L., System Identification, Theory for the User, 2nd Edition, Prentice-Hall, 1999). Alternative methods of estimation of parameters are well known in the art; accordingly, a more detailed description of these methods is not provided herein.

Figure 5:
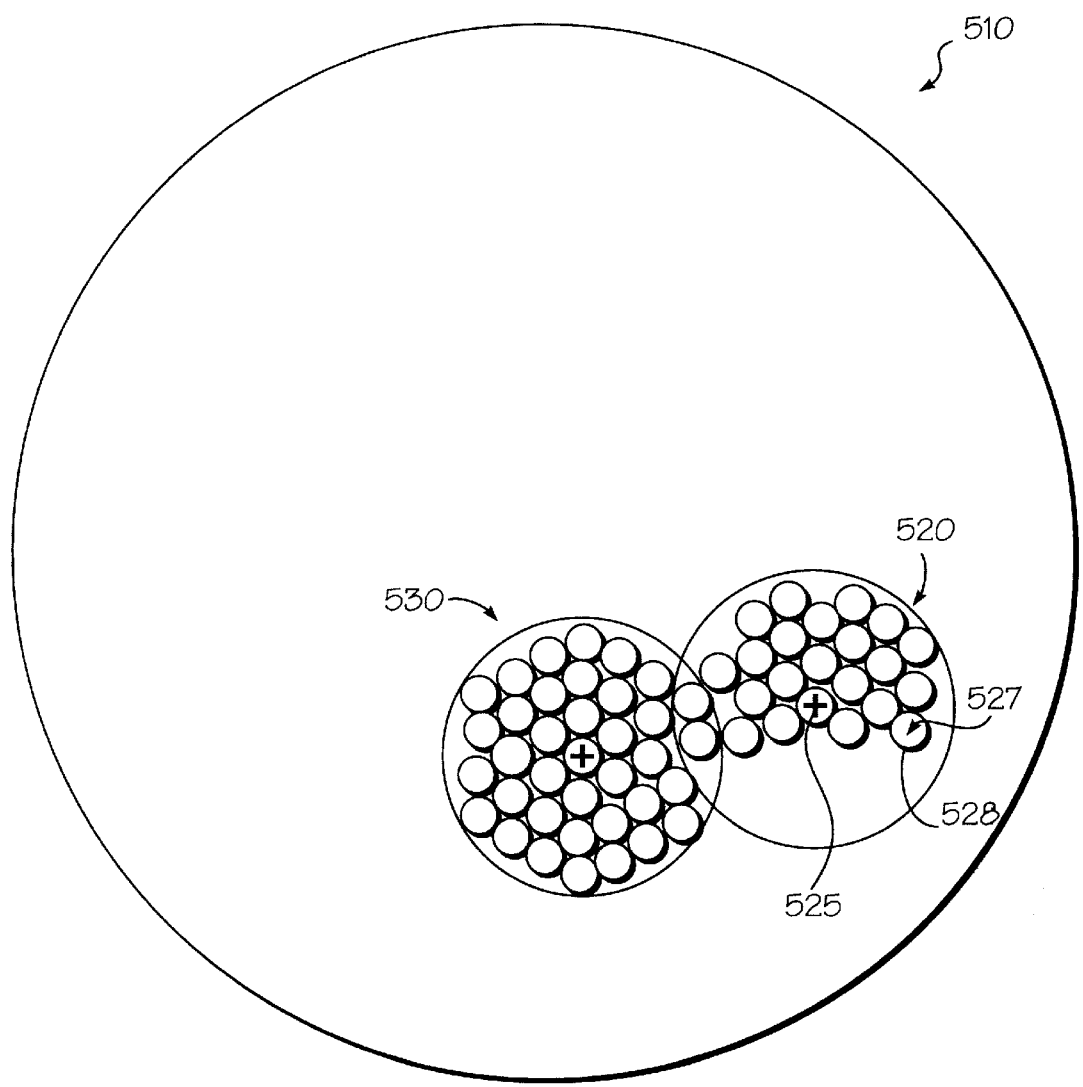
FIG. 5 illustrates an embodiment of an uncertainty model.

FIG. 5 illustrates one embodiment of an uncertainty model. In one embodiment, the uncertainty model 510 includes all drives operating under all conditions in use. As previously discussed, at design time 220 of FIG. 2, it is possible to obtain in-use uncertainty for prototype drives as well as for representative drives. The model for a drive under a specific operating condition is shown in 527 along with its uncertainty model 528. The model for that drive under a nominal operating condition is shown as 525. Uncertainty for all operating conditions for that drive is shown as 520.

Models for each representative drive under all operating conditions and its corresponding uncertainty model (e.g., model 530) may also be obtained. The operating conditions may include, for examples: thermal, vibration environment, head, platter and zone on platter. The metric chosen to represent model variations is defined in terms of weighted frequency responses, where the weights are chosen to reflect sensitivity of closed-loop performance to model variations. In addition, a lower performance, highly robust controller is computed for instances when in-use data that determines the actual behavior of a plant is not yet available.

At manufacturing time 230 of FIG. 2, the drives are manufactured to a target specification developed at design time 220 of FIG. 2. A particular manufactured drive may then be evaluated to obtain its nominal control model. In one embodiment, off-line calculations are performed on a manufactured drive using available compute resources to obtain patterns of uncertainty in order to find the best pre-computed (at design time 220) models around the drive to represent its in-use variations. By characterizing the in-use model variations around the nominal model for each representative drive at design time 220 of FIG. 2, the in-use variation of a manufactured drive may be extrapolated from its nominal model obtained at manufacturing time 230 of FIG. 2. The uncertainty model, thus, allows for full manufacturing time adaptation of the servo controller for each production unit. This may improve manufacturing yield and unit reliability because of designed-in servo tolerances to manufacturing variations.

At manufacturing time 230 of FIG. 2, a subset of the control models may be selected from the larger set of control models, developed at design time 220 of FIG. 2, based on measured unit-to-unit manufacturing variations. A group of model controllers, corresponding to the subset of control models selected at design time 240 to manage extrapolated in-use variations, is implemented in a drive. A particular model controller within the model controller group may then be selected at run-time based on data derived from the operation of the drive. In one embodiment, the model controller group is implemented in a servo system controller using hardware. In another embodiment, the model controller group is implemented in a servo system using software.

The control scheme described herein, allows for the uncertainty of control systems to be managed by using successive uncertainty identification and reduction, knowledge of uncertainty in the control approach, and matching algorithms with available compute resources. The controller architecture is multi-scale adaptive because it uses successive reduction of uncertainty at different time scales (i.e., design, manufacturing, and in-use) and matches computational algorithms with available compute resources.

Figure 6:
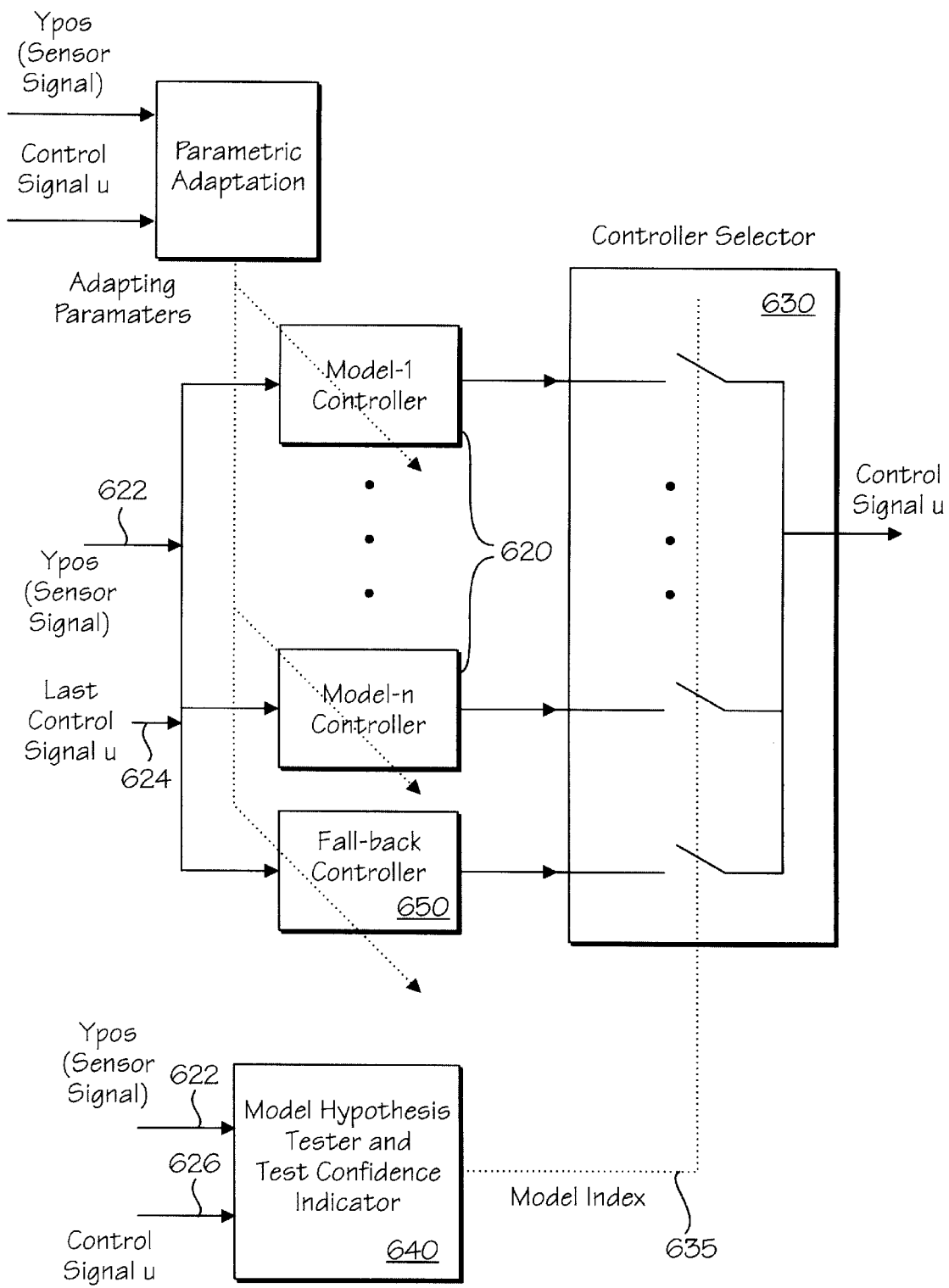
FIG. 6 illustrates an embodiment of a multiple model controller.

FIG. 6 illustrates an embodiment of a multiple model controller. In one embodiment, adaptive parameter model controllers are developed at design time 220 of FIG. 2. In one embodiment, if RRO is expected to vary, feedforward adaptation for RRO may be performed at initialization of run time 240 of FIG. 2. Typically RRO adaptation uses the input-output response given by model i controllers chosen by hypothesis testing, and finds the periodic components that best describe the offending harmonics. The feedfoward compensates for the offending harmonics by inverting the plant response at the harmonics and feeding them to the plant input.

At design time 220, each model controller may be designed to handle a narrow range of resonance and disturbance for a specific operating condition. Then at manufacturing time 230 of FIG. 2, a subset of model controllers 620 (Model-1 controller to modern controller, where n is an integer), developed from their corresponding control models, may be selected. The model controller group 620 selected at manufacturing time 230 of FIG. 2 may be able to accommodate a range of resonance and disturbance that is larger than the resonance and disturbance that may be handled by the best single model controller.

A controller selector 630 is used to switch between model controllers 620 during operation of the drive using data obtained from monitoring the operation of the system. For example, transients may occur due to seek and settling of a head, generating transient signals. These transient signals may be monitored to determine the appropriate controller to select from among model controllers 620 with each of the controllers designed to handle a particular transient signal range. A sufficient set of data is collected before switching between model controllers 620 to reduce the probability of an incorrect model controller being selected. In one embodiment, parametric adaptation is performed regardless of which model controller is selected, however, the adaptation may be based on the states of the estimator within the selected model controller.

A data evaluator 640 monitors the transient in Ypos 622 and determines if there is enough information to select a particular model controller and, if so, which model controller to select. In one embodiment, the data evaluator 640 is a model hypothesis tester and test confidence indicator. If the test confidence indicator shows a high confidence level, the hypothesis tester determines which of the model controllers 620 should be used. For example, the control input 626 to data evaluator 640 may be a VCM current or actuator voltage. The VCM current or actuator voltage must have sufficient power at frequency bands over which disturbances are to be rejected. If there is insufficient power, the hypothesis tester may not be able to obtain sufficient information to determine which of the model controllers 620 is suited to provide the best performance.

In one embodiment, the currently selected model controller continues to be used in the event that the hypothesis tester has insufficient information. In another embodiment, if the performance of the currently selected model controller is determined to be poor and there is insufficient data to select an appropriate model controller, then a fall-back model controller 650 is selected. Fall-back model controller 650 is designed to be robust enough to maintain the system until sufficient data is obtained to select a more appropriate model controller.

As previously discussed, model uncertainty may be obtained for a given identified model at design time 220 of FIG. 2. In one embodiment, the model uncertainty provides bounds as an additive uncertainty for both input-output behavior and disturbance-output behavior. The uncertainty bounds are in a form so that they work with standard control design methods, for examples, H-infinity robust control and $\mu$-synthesis robust control design methods. In one embodiment, the control models are designed using parametric adaptation methods in which the input parameters to the control model are gradually changed. Typical adapted parameters may be, for examples: amplitudes and phase harmonics in quasi-periodic run-out, loop gains, and known dependencies of a model controller on a particular data location on a disk.

In one embodiment, the model hypothesis testing may be performed using a Generalized Likelihood Ratio Test (GLT) for M-ary hypothesis. Given M disjoint states of the world given by Hypotheses $H_0, H_1, \ldots, H_M$, choose hypothesis $H_i$ (where i is an integer) that maximizes the log likelihood function $\lambda_i(z)=\log(p(z|H_i))$ where the observed data z has a conditional probability distribution function $p(z|H_i)$.

A GLT is employed where the observed data (e.g., Ypos) also depends on some unknown parameter x. The unknown parameter may be, for example, unmeasured states of the dynamic system. In this case, the GLT consists of choosing hypothesis $H_i$ when $\max_x \log(p(z|x, H_i)) > \max_x \log(p(z|x, H_j))$. For model controllers with unknown parameters $\theta$ belonging to a discrete set $\{\theta_1, \theta_2, \ldots \theta_M\}$, a bank of conditional Kalman Filters yielding conditional innovations sequences $v_k^i = v_{k|\theta_i}$ are used. The power in each conditional innovations sequence is computed and the one with the least power indicates the chosen control model. See also, Anderson and More, Optimal Filtering, Prentice-Hall, 1979, pages 267–273, and Willsky, A., Generalized Likelihood Ratio Approach to State Estimation in Linear Systems Subject to Abrupt Changes, Proceedings of IEEE CDC, 1974, pages 84–6853.

Figure 7:
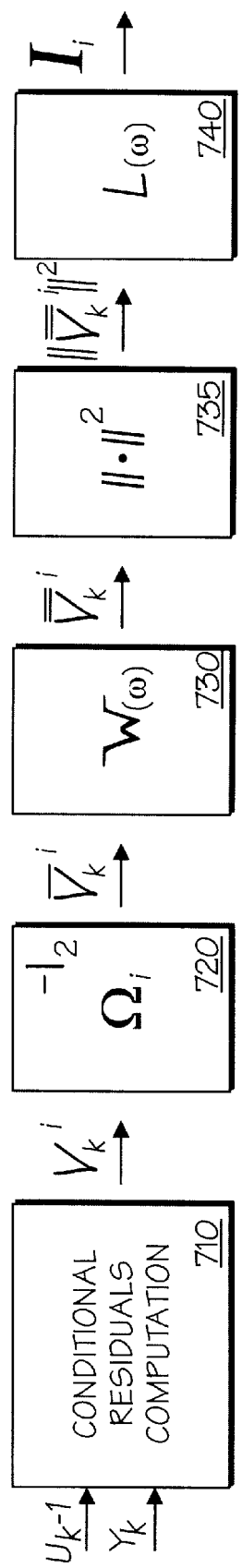
FIG. 7 illustrates an embodiment of a hypothesis tester and test confidence indicator.

FIG. 7 illustrates an embodiment of a hypothesis tester and test confidence indicator. Identified models (e.g., ARX) at design time 220 of FIG. 2, are converted to their state-space innovations forms using techniques well-known in the art, as described in Ljung, L., System Identification, Theory for the User, 2nd Edition, Prentice-Hall, 1999. The model controllers are switched by model index 635 of FIG. 6. In one embodiment, the innovation form for model i is given by:

$$x_{k+1}^i = A^i x_k^i + B^i u_k + K_f^i E_k^i$$

$$y_k = C^i x_k^i + E_k^i$$

$$E\{E_k^i E_k^{iT}\} = \Omega_i$$

where $y_k$ is the measurement at time k; and $$u_k = \begin{bmatrix} Uactuator_k \\ Uperiodic_k \end{bmatrix}$$

$x_k^i$ is the state vector at time k for model i.
$\{A_i, B_i, C_i, K_f^i\}$ are matrices describing model i in the state-space innovations form. The computation of coefficients are computed at design time 220 of FIG. 2.

In one embodiment, the conditional residuals are computed at run time 240 of FIG. 2. The conditional residuals computation 710 is performed using the innovations models. In one embodiment, the conditional residuals, $v_k^i$, are computed using the following equation:

$$v_k^i = y_k - C^i \hat{x}_k^i$$

$$\hat{x}_k^i = A^i \hat{x}_{k-1}^i + B^i u_{k-1} + K_f^i v_{k-1}^i$$

The conditional residuals are then normalized, 720, where $\bar{v}_k^i = \Omega_i^{-1/2} v_k^i$ are the normalized residuals. The normalized conditional residuals are filtered using weighting filters $W(\omega)$ 730. These weighting filters 730 are those used for the metric of model variations and they reflect sensitivity of closed-loop performance to model variations. A power estimate $(I_i)$ is computed with lowpass filter 740 which receives magnitude square filtered residuals from magnitude square operator 735.

In one embodiment, to perform model selection, given a previously (during previous sample time) selected model controller k, choose a new model controller j, where j does not equal k, if:

j=arg min$_i\{I_i\}$, and test confidence indicator=high.

Figure 8:
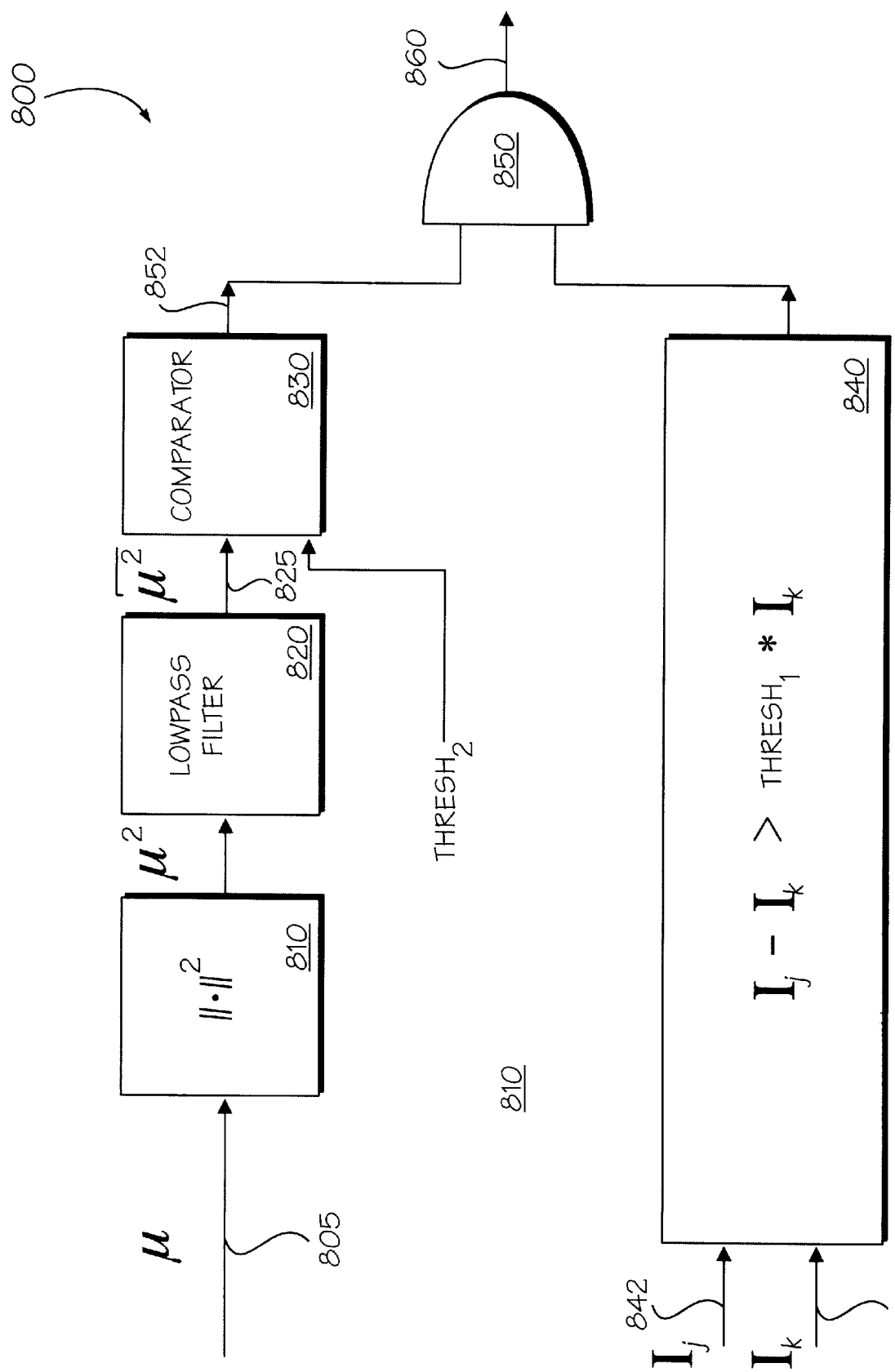
FIG. 8 illustrates an embodiment of a test confidence indicator.

FIG. 8 illustrates an embodiment of a test confidence indicator. Test confidence indicator 800 includes a magnitude square operator 810, a lowpass filter 820, a AND gate 850, and comparators 830 and 840. An input (u) 805 is applied to magnitude square operator 810, for example, an actuator control input 626 of FIG. 6. The magnitude squared of input 805 is applied to lowpass filter 820. The filtered output 825 is applied to comparator 830. Comparator 830 determines if filtered output 825 is greater than a threshold value (THRESH$_2$). In one embodiment, the threshold value of comparator 840 is between $3*\overline{u^2}_{trackfollowing}$ and $10*\overline{u^2}_{trackfollowing}$. It should be noted, that $\overline{u^2}_{trackfollowing}$ may be a lowpass filtered actuator input energy (squared value) during track following determined by simulations performed at design time 220 of FIG. 2. In another embodiment, THRESH$_2$ may be other values.

A monitored parameter value from a current sample time $(I_j)$ 842 and a previous sample time $(I_k)$ 844 is applied to comparator 840, for example, position sensor signal 622 of FIG. 6. Comparator 840 determines if the difference between input 842 and 844 is greater than a threshold value multiplied by input 844. In one embodiment, the threshold value (THRESH$_1$) is between 1.1 and 2.0. In another embodiment, THRESH$_1$ may be more than 2.0 or less than 1.1.

The outputs 852 and 854 of comparators 830 and 840, respectively, are applied to AND gate 850 with the output 860 of AND gate 850 being the confidence value. In one embodiment, the lowpass filter in test confidence indicator 800 and filter 740 of FIG. 7 are chosen such that slow variations on the order of seconds pass-through. In an alternative embodiment, the test confidence indicator of data evaluator 640 of FIG. 6 may be implemented by counting for a fixed number of track changes larger than a predetermined number of tracks.

As previously discussed, the controllers are switched at run-time based on data derived from the operation of the drive, for example, transients due to seek settling and the confidence of that data. In this manner, the system may provide a highly tuned controller using both parametric adaptation within a model controller and system adaptation. The system is adaptive by enabling the control system's signal path to be changed to a different controller based on the value of the data derived from in-use operation of the drive. By using an adaptive servo control system, the bandwidth of the servo system may be increased. A higher bandwidth may yield tighter head position control and, thereby, increase the tracks per inch (TPI) over non-adaptive servo systems. The increased bandwidth may also result in improved settling time of the system.

As previously noted, the control scheme describe herein may be implemented with a wide variety of systems. In an alternative embodiment, the control scheme may be used for adaptation to unmeasured variables in non-resonant systems, for example, changes in viscous friction in a motor drive control. A motor drive control may be described by the equation:

$$J\ddot{\theta} + B\dot{\theta} = T_{electrical}, \text{ where}$$

where J is the inertia of the drive system, B is the unknown viscous friction, θ is the angular position of the motor shaft, and $T_{electrical}$ is the applied exogenous torque generated by the electromagnetic field. In one embodiment, it is assumed that the viscous friction changes because of the temperature of the bearings and the humidity of the air, and that there are no direct measurements of the bearing temperature or the air humidity. For a fixed motor position control system that uses speed measurement, changing viscous friction would deteriorate position control performance. The resulting system performance would be sensitive to unmeasured temperature and humidity variations. An adaptive system that estimates changing dynamics of the motor drive system and adapts the controller parameters to the changes would allow the control system performance to remain constant in spite of variations in the dynamics.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A disk drive system, comprising:
    a head assembly; and
    a servo controller coupled to the head assembly, the servo controller comprising:
        a plurality of model controllers, each of the plurality of model controllers coupled to receive a plurality of head position sensor signals, each of the plurality of model controllers to generate a control signal; and
        a data evaluator coupled to receive the plurality of head position sensor signals and generate an output, the data evaluator to determine when sufficient information from the plurality of head position sensor signals is received, the data evaluator coupled to select the control signal of one of the plurality of model controllers based on the output of the data evaluator.

2. The disk drive system of claim 1, wherein the data evaluator comprises a model hypothesis tester and test confidence indicator.

3. The disk drive system of claim 2, wherein the output is a model index.

4. The disk drive system of claim 3, wherein the servo controller further comprises:
    a fall-back controller coupled to receive the plurality of head position sensor signals, the fall-back controller generating the control signal and wherein the model hypothesis tester and test confidence indicator is coupled to select the control signal of the fall-back controller when insufficient information from the plurality of head position sensor signals is received; and
    a controller selector coupled to receive the model index, the controller selector coupled to receive the control signal of each of the plurality of model controllers and the fall-back controller, the controller selector to output the control signal of one of the plurality of model controllers based on the model index.

5. The disk drive system of claim 4, wherein the control signal is a voice coil motor current.

6. The disk drive system of claim 4, wherein the control signal is an actuator voltage.

7. A method of handling disk drive variations, comprising:
    receiving a plurality of position sensor signals by a servo controller, the plurality of position sensor signals having a range of a factor;
    evaluating the plurality of position sensor signals to determine when sufficient information of the plurality of position sensor signals is received; and
    selecting one of a plurality of model controllers within the servo controller based on the factor.

8. The method of claim 7, wherein evaluating comprises performing a generalized likelihood ratio test on the plurality of position sensor signals to determine when there is a high confidence in the plurality of position sensor signals received by the servo controller.

9. The method of claim 8, further comprising:
    receiving a control signal by the servo controller, each of the plurality of the model controllers having adaptive parameters affecting the received control signal; and
    gradually adjusting the adaptive parameters of the selected one of the plurality of model controllers.

10. The method of claim 7, wherein the factor is resonance.

11. The method of claim 7, wherein the factor is disturbance.

12. The method of claim 11, wherein the factor is environment.

13. A disk drive, comprising:
    means for receiving a plurality of position sensor signals by a servo controller, the plurality of position sensor signals having a range of a factor;
    means for evaluating the plurality of position sensor signals to determine when sufficient information of the plurality of position sensor signals is received; and
    means for selecting one of a plurality of model controllers within the servo controller based on the factor.

14. The disk drive of claim 13, wherein the means for evaluating comprises performing a generalized likelihood ratio test on the plurality of position sensor signals to determine when there is a high confidence in the plurality of position sensor signals received by the servo controller.

15. The disk drive of claim 14, further comprising:
    means for receiving a control signal by the servo controller, each of the plurality of the model controllers have adaptive parameters affecting the received control signal; and
    means for gradually adjusting the adaptive parameters of the selected one of the plurality of model controllers.

16. The disk drive of claim 13, wherein the factor is resonance.

17. A machine readable medium having stored thereon instructions, which when executed by a processor cause the processor to perform the following:
    receiving a plurality of position sensor signals by a servo controller, the plurality of position sensor signals having a range of a factor;
    evaluating the plurality of position sensor signals to determine when sufficient information of the plurality of position sensor signals is received; and
    selecting one of a plurality of model controllers within the servo controller based on the factor.

18. The machine readable medium of claim 17, wherein evaluating comprises performing a generalized likelihood ratio test on the plurality of position sensor signals to determine when there is a high confidence in the plurality of position sensor signals received by the servo controller.

19. The machine readable medium of claim 18, wherein the processor further performs:
    receiving a control signal by the servo controller, each of the plurality of the model controllers having adaptive parameters affecting the received control signal; and
    gradually adjusting the adaptive parameters of the selected one of the plurality of model controllers.

20. The machine readable medium of claim 17, wherein the factor is resonance.

21. The machine readable medium of claim 17, wherein the factor is disturbance.

* * * * *